(12) United States Patent
Lee

(10) Patent No.: US 6,522,552 B1
(45) Date of Patent: Feb. 18, 2003

(54) WIRELESS MEMORY CARD READER

(75) Inventor: Chung-Liang Lee, Taipei (TW)

(73) Assignee: Power Quotient International Co., Ltd., Taipei Hsien (TW)

( * ) Notice: Subject to any disclaimer, the term of this patent is extended or adjusted under 35 U.S.C. 154(b) by 0 days.

(21) Appl. No.: 09/987,813

(22) Filed: Nov. 16, 2001

(51) Int. Cl.[7] ............................................. H05K 7/00
(52) U.S. Cl. ........................ 361/752; 361/684; 361/683; 361/800; 439/159
(58) Field of Search ................................. 361/752, 683, 361/684, 719, 730, 714, 724, 800, 796, 814; 439/785; 340/159

(56) References Cited

U.S. PATENT DOCUMENTS

| | | | | |
|---|---|---|---|---|
| 5,867,795 A | * | 2/1999 | Novis et al. | 455/550 |
| 6,089,889 A | * | 7/2000 | Chiou et al. | 439/157 |
| 6,216,188 B1 | * | 4/2001 | Endo et al. | 710/103 |
| 6,219,439 B1 | * | 4/2001 | Burger | 235/280 |
| 6,335,678 B1 | * | 1/2002 | Heutschi | 340/286.01 |

* cited by examiner

*Primary Examiner*—David Martin
*Assistant Examiner*—Hung Bui
(74) *Attorney, Agent, or Firm*—Troxell Law Office PLLC

(57) ABSTRACT

A wireless memory card reader comprises a card insertion read/write device and a host unit read/write device. The card insertion read/write device further comprises a casing with a card slot and an inner card socket for being inserted with a memory card, a printed circuit board received in the casing with a required circuit thereon, a wireless transmission driver fixed to the printed circuit board for a signal being wave-mixed, demodulated and amplified, a battery seat with at least a battery arranged at a lateral side of the casing for supplying the power needed by the circuit, a card socket fixed to the printed circuit board and connecting with the circuit for being inserted with the memory card, and an antenna connected to the printed circuit board for sending and receiving radio signals. The host unit end read/write device further comprises a casing, a printed circuit board received in the casing with a required circuit thereon, a wireless transmission driver fixed to the printed circuit board for the signal being wave-mixed, demodulated, and power amplified, and a USB lead wire with a connector extending outward from the casing.

6 Claims, 3 Drawing Sheets

WIRELESS MEMORY CARD READER

BACKGROUND OF THE INVENTION

1. Field of the Invention

The present invention relates to a wireless memory card reader, and, particularly, to a memory card reader, which can provide wireless communication with Universal Series Bus (USB) interface for a memory card, and a method of using the card reader.

2. Description of Related Art

Currently, the card reader developed for reading/writing a flash memory card is designed to provide a wire transmission for sending and receiving data with regard to the memory card. However, in order to design a card reader with lightness, smallness, shortness, and thinness for being carried conveniently, it would be helpful if the card reader could receive and send the data by way of a wireless arrangement.

SUMMARY OF THE INVENTION

A wireless card reader system of the present invention comprises a sending end a receiving end with data being loaded by a flash memory in the sending end and transmitted to a wireless transmission driver by way of a USB controller converting the data into USB format data and passing through a USB interface so as to be emitted to and received by the receiving end with a default frequency formed by way of the signal being modulated and wave-mixed.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
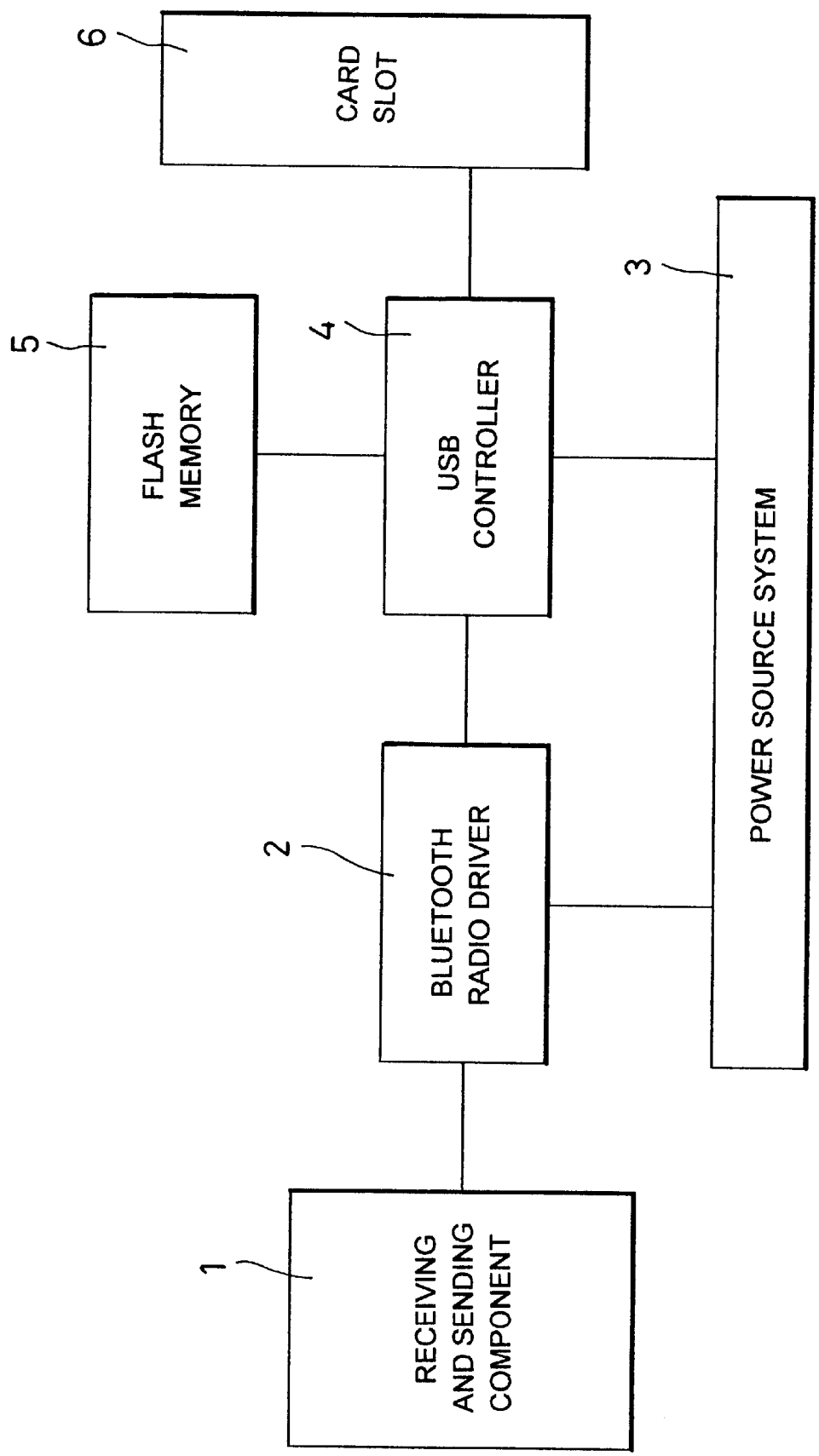
FIG. 1 is a system block diagram at the card insertion end of a wireless card reader according to the present invention.

Referring to FIG. 1, a system block diagram at the card insertion end of a wireless memory card reader according to the present invention is illustrated to explain the basic innovative concept of the present inventor. The system is in a casing and, especially, provides a circuit board with components including a receiving and sending component 1 for receiving and sending the radio signal, a Bluetooth radio driver 2 for the digital signal being from card-end and the analog signal being modulated, changed over each other, wave-mixed, signal-filtered and power-amplified, a power source system 3 for supplying the work power needed by the circuit, a USB controller 4, an internal flash memory 5, and a card slot 6.

When an external flash memory card is inserted into the card slot 6, the USB controller 4 may execute to read the digital data in the external flash memory card in accordance with an internal program thereof and convert the data to USB format data so that the USB format data can be sent to the Bluetooth wireless transmission driver 2 for modulating to be an analog signal. Then, the modulated signal is mixed with the Bluetooth frequency at the signal receiving and sending part 1 to be a RF signal, such that the data is sent to the host system via the host unit end shown in FIG. 2.

Figure 2:
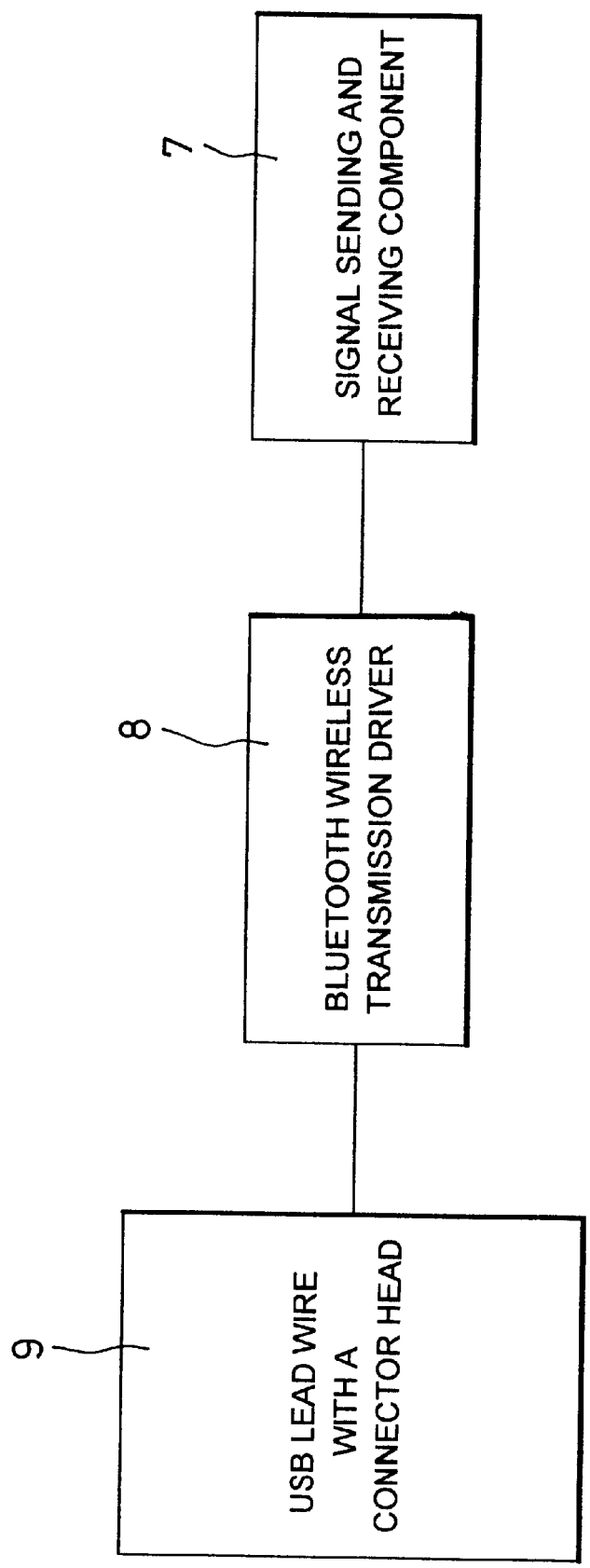
FIG. 2 is a system block diagram at the host unit end of a wireless card reader according to the present invention.

Referring to FIG. 2, the host unit end system, a subsystem connected to host system, block diagram is illustrated. The sub-system comprises a signal sending and receiving component 7 for receiving and sending radio signal, a Bluetooth wireless transmission driver 8 for offering conversion between digital and analog signals and offering wave mixing with functions of signal filtering and wave amplifying, and a USB lead wire with a connector head 9. These parts are arranged on a circuit board in a casing.

When the signal is transmitted to the signal sending and receiving component 7 via the card end system, the Bluetooth wireless transmission driver 8 may demodulate the signal and lower down the frequency of the signal such that the original signal can recover from RF signal, which meets the USB interface standard. Then, the original digital data can be transmitted to the host system through the USB lead wire with the connector 9 such that the function of wireless transmission for the data can be reached, and vice versa, that is, the signal can be sent to or written into the interior of the memory card via the host unit end by way of wireless transmission.

Moreover, referring to FIG. 1 again, in case of no external memory card is inserted, a flash memory card 5, which has been built in the card insertion end, can act as a buffer component to save the data via the USB controller 4 for the card reader being operated by the user conveniently.

Figure 3:
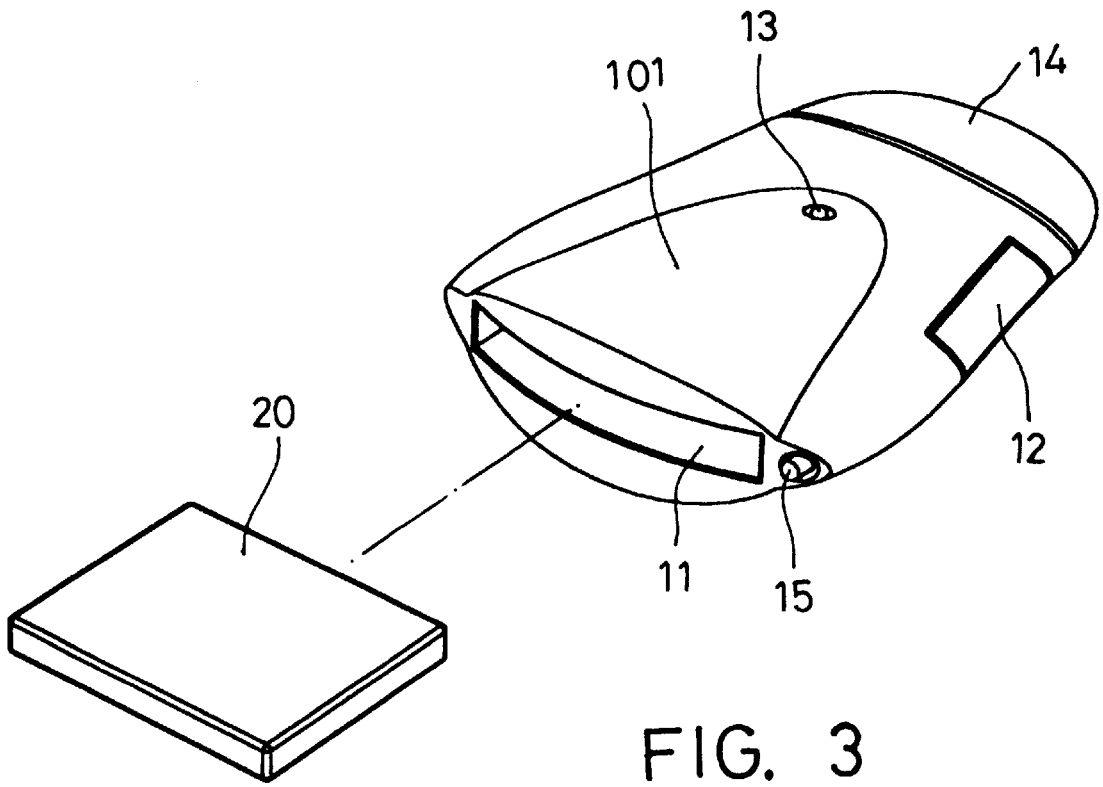
FIG. 3 is a perspective view of an appearance of the card insertion end of the wireless card reader according to the present invention.

Referring to FIG. 3, a physical card insertion end is illustrated. An appearance of the casing 101 shown is one of the configurations possible be made so that it is not a restriction. A memory card 20 is used for being inserted into an insertion slot 11 in the casing 101 and a lateral side of the casing 101 can be arranged a battery seat 12 with an ejection button 15 next to a lateral end of the card slot 11. An end opposite to the insertion slot 11 is provided with an antenna 14. Besides, the upper panel of the casing 101 can be attached with an indicator light 13 and the preceding parts with regard to sending and receiving signals are mounted in the casing 101.

Figure 4:
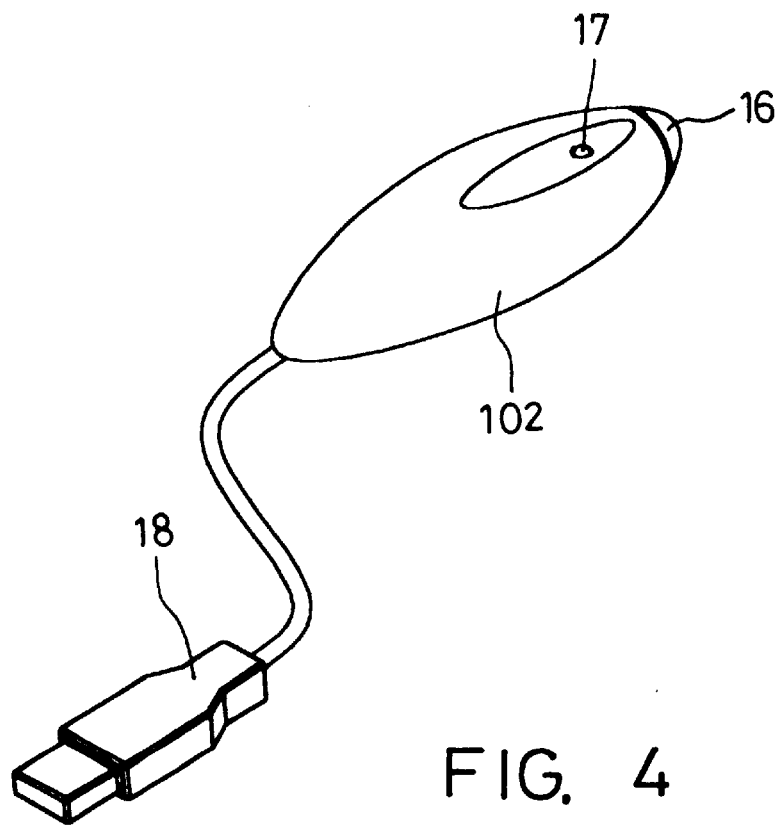
FIG. 4 is a perspective view of an appearance of the host unit end of a wireless card reader according to the present invention.

Referring FIG. 4, a physical host unit end is illustrated. A casing 102 of the host unit end 102 at an end thereof extends outward a USB lead wire with a connector 18 and at the other end thereof is an antenna 16 with an upper panel thereof providing an indicator light 17 for operation.

It is appreciated from the preceding description that the wireless memory card reader of the present invention reads the data from an inserted card or writes the data into the inserted card with the wireless transmission so as to achieve a purpose of being carried conveniently and operated easily. Theses are advantages not possible to be reached with the prior art.

While the invention has been described with reference to a preferred embodiment thereof, it is to be understood that modifications or variations may be easily made without departing from the spirit of this invention, which is defined in the appended claims.

What is claimed is:

1. A wireless memory card reader system comprising:
   a) a data card insertion unit for wirelessly transmitting/receiving data and including a first casing with: a card insertion slot device configured to receive a memory card therein; a USB controller connected to the card insertion slot device to convert data received from the card insertion slot device into USB format; a Bluetooth radio driver connected to the USB controller; a first antenna connected to the Bluetooth radio driver for receiving and sending RF signals; and, a power source connected to the USB controller and to the Bluetooth radio driver;

b) a host unit end system including a second casing with: a second antenna for sending and receiving RF signals with the first antenna; and a Bluetooth wireless transmission driver connected to the second antenna; and, c) a USB lead wire connected to the Bluetooth wireless transmission driver and extending from the second casing, the USB lead wire having a USB connector on a distal end, whereby data is wirelessly transmitted between the card insertion unit and the host unit end.

2. The wireless memory card reader system of claim 1 further comprising a flash memory card connected to the USB controller.

3. The wireless memory card reader system of claim 1 wherein the first casing further includes a battery seat located in a lateral side of the first casing.

4. The wireless memory card reader system of claim 1 wherein the first casing further includes an indicator light.

5. The wireless memory card reader system of claim 1 wherein the second casing further includes an indicator light.

6. The wireless memory card reader system of claim 1 wherein the card insertion unit further includes an ejection button for ejecting a card in the card insertion slot device.

* * * * *